United States Patent [19]

Inoue et al.

[11] Patent Number: 5,522,052
[45] Date of Patent: May 28, 1996

[54] PIPELINE PROCESSOR FOR PROCESSING INSTRUCTIONS HAVING A DATA DEPENDENCE RELATIONSHIP

[75] Inventors: Masao Inoue; Jiro Miyake, both of Osaka, Japan

[73] Assignee: Matsushita Electric Industrial Co. Ltd., Osaka, Japan

[21] Appl. No.: 408,174

[22] Filed: Mar. 22, 1995

Related U.S. Application Data

[63] Continuation of Ser. No. 909,225, Jul. 1, 1992, abandoned.

[30] Foreign Application Priority Data

Jul. 4, 1991 [JP] Japan ............................. 3-164488

[51] Int. Cl.[6] ................ G06F 9/30; G06F 9/22
[52] U.S. Cl. .................... 395/375; 395/250; 364/964; 364/964.26; 364/DIG. 2; 364/251; 364/DIG. 1
[58] Field of Search ................... 395/375, 700, 395/725, 800, 250

[56] References Cited

U.S. PATENT DOCUMENTS

| | | | |
|---|---|---|---|
| 3,949,379 | 4/1976 | Ball | 340/172.5 |
| 4,594,655 | 6/1986 | Hao et al. | 395/775 |
| 4,766,566 | 8/1988 | Chuang | 395/375 |
| 4,916,606 | 4/1990 | Yamaoka et al. | 395/375 |
| 4,945,472 | 7/1990 | Sakamura et al. | 395/375 |
| 4,958,276 | 9/1990 | Kiuchi et al. | 395/375 |
| 5,006,980 | 4/1991 | Sander et al. | 395/375 |
| 5,041,968 | 8/1991 | Yamaguchi | 395/725 |
| 5,043,868 | 8/1991 | Kitamura et al. | 395/375 |
| 5,073,855 | 12/1991 | Staplin et al. | 395/375 |
| 5,075,849 | 12/1991 | Kuriyama et al. | 395/400 |
| 5,163,157 | 11/1992 | Yamano et al. | 395/800 |
| 5,287,465 | 2/1994 | Kurosawa et al. | 395/375 |
| 5,301,341 | 4/1994 | Vassiliadio et al. | 395/800 |
| 5,363,495 | 11/1994 | Fry et al. | 395/375 |

FOREIGN PATENT DOCUMENTS 2-230326  9/1990  Japan.
2-301833  12/1990  Japan.

OTHER PUBLICATIONS

Lin et al.; "ARES—Architecture REinforcing Superscalar.", IEEE, 1991, pp. 338–343.

G. Blanck et al., *The SuperSPARC Microprocessor*, IEEE, pp. 136–141 (1992).

Primary Examiner—Thomas G. Black
Assistant Examiner—C. Pham
Attorney, Agent, or Firm—Willian Brinks Hofer Gilson & Lione

[57] ABSTRACT

A pipeline processor comprises a memory stage arithmetic unit, a data dependence detecting unit and a control unit. The data dependence detecting unit outputs a detection signal to the control unit when it detects the data dependent relationship between a load instruction LD and a subtraction instruction SUB to be executed next thereto. The control unit receives the detection signal to control such that load data to be loaded from a memory unit according to the load instruction LD is inputted to the memory stage arithmetic unit. The memory stage arithmetic unit executes subtraction by using the load data in a memory stage of the subtraction instruction SUB.

15 Claims, 16 Drawing Sheets ns, that is, load data to be loaded from a memory unit 9 according to the first instruction is used according to the second instruction, the load data read out from the memory unit 9 according to the first instruction, i.e., load instruction is inputted to the EX stage arithmetic unit 2 through a bypass path 8.

FIG. 10 is a diagram showing the operation of the pipeline processor according to the first prior art. In FIG. 10, the first instruction to be executed earlier is a load instruction LD. The load instruction LD specifies data stored in a register r1 as an address of the memory unit 9 to read out data stored in the address from the memory unit 9, and stores load data read out from the memory unit 9 in a register r2. The second instruction to be executed next to the first instruction is a subtraction instruction SUB. The subtraction instruction SUB subtracts data stored in a register r3 from the data stored in the register r2, and stores the operation result in a register r4. Since data read out from the register r2 has not been reloaded by the execution of the first instruction, i.e., load instruction LD in a DEC stage of the second instruction, i.e., subtraction instruction SUB, it cannot be used for the operation of the second instruction, i.e., subtraction instruction SUB. The load data obtained by executing the first instruction, i.e., load instruction LD is stored in the register r2 in a WB stage of the first instruction. The load data read out from the memory unit 9 in a MEM stage of the first instruction which has not been stored in the register r2 is transferred to the EX stage arithmetic unit 2. However, an EX stage for executing the operation of the second instruction, i.e., subtraction instruction SUB is delayed by 1 cycle. Herein, a stage for waiting for operations to be executed is indicated at STALL.

PIPELINE PROCESSOR FOR PROCESSING INSTRUCTIONS HAVING A DATA DEPENDENCE RELATIONSHIP

This is a continuation application of application Ser. No. 07/909,225, filed Jul. 1, 1992, now abandoned.

BACKGROUND OF THE INVENTION

The present invention relates to a pipeline processor for dividing an instruction into a plurality of stages so as to carry out pipeline processing, and more particularly to a pipeline processor for transferring data obtained by instruction execution to another instruction at a high speed.

In an information processor according to the prior art, an instruction is divided into a plurality of stages, a next instruction stage is executed when the execution of an instruction stage is completed, so that the result of an instruction is obtained every stage execution time to enhance a processing speed. Thus, an information processor for dividing an instruction into a plurality of stages for execution is referred to as a pipeline processor.

Referring to the pipeline processor described above, each instruction is divided into an instruction read-out stage (IF stage), an instruction decode stage (DEC stage), an execution stage (EX stage), a memory stage (MEM stage) and a write stage (WB stage) for execution. In the IF stage, an instruction is read out. In the DEC stage, the instruction is decoded and data is read out from a register file. In the EX stage, an operation specified by the instruction is executed. In the MEM stage, a memory is accessed if the instruction is a load or store instruction. In the WB stage, the data is stored in the register file.

The pipeline processor according to the prior art will be described with reference to the drawings.

(First Prior Art)

The first prior art provides a pipeline processor for dividing a first instruction and a second instruction to be executed next thereto into a plurality of stages so as to carry out pipeline processing, in which the first instruction is a load instruction LD and the second instruction is a subtraction instruction SUB.

FIG. 9 is a block diagram showing a pipeline processor according to the first prior art. In FIG. 9, the pipeline processor according to the first prior art comprises an arithmetic unit 6. The arithmetic unit 6 pipelines a first instruction to be executed earlier and a second instruction to be executed next thereto, and includes an EX stage arithmetic unit 2, a MEM stage latch 4, a selective circuit 5 and a WB stage latch 3.

The pipeline processor according to the first prior art comprises a register file 1 to be used by the arithmetic unit 6. The register file 1 includes a lot of registers 1a, 1b ... Data stored in the registers 1a and 1b are used for the operations of the first and second instructions in the EX stage arithmetic unit 2, respectively. The operation result in the EX stage arithmetic unit 2 is stored in the register file 1 through the MEM stage latch 4, selective circuit 5 and WB stage latch 3.

In the pipeline processor according to the first prior art, the first instruction to be executed earlier is a load instruction LD, and the second instruction to be executed next thereto is an operation instruction. In the case where there is the data dependent relationship between the first and second instruc-

(Second Prior Art)

The second prior art provides a pipeline processor for dividing a first instruction and a second instruction to be executed next thereto into a plurality of stages so as to simultaneously pipeline first and second instructions, in which the first instruction is an addition instruction ADD and the second instruction is a subtraction instruction SUB.

FIG. 11 is a block diagram showing a pipeline processor according to the second prior art. In FIG. 11, the pipeline processor according to the second prior art comprises first and second arithmetic units 6a and 6b. The first arithmetic unit 6a pipelines a first instruction to be executed earlier, and the second arithmetic unit 6b pipelines a second instruction to be executed next to the first instruction at the same time. The first arithmetic unit 6a includes a first EX stage arithmetic unit 2a, a first MEM stage latch 4a, a first selective circuit 5a and a first WB stage latch 3a. Similarly, the second arithmetic unit 6b includes a second EX stage arithmetic unit 2b, a second MEM stage latch 4b, a second selective circuit 5b and a second WB stage latch 3b.

The pipeline processor according to the second prior art comprises a register file 1 which is shared by the first and second arithmetic units 6a and 6b. The register file 1 includes a lot of registers 1a, 1b, 1c, 1d . . . Herein, it is supposed that data stored in the registers 1a and 1b are used for the operation of the first instruction in the first EX stage arithmetic unit 2a, and data stored in the registers 1c and 1d are used for the operation of the second instruction in the second EX stage arithmetic unit 2b. The operation result in the first EX stage arithmetic unit 2a is stored in the register file 1 through the first MEM stage latch 4a, first selective circuit 5a and first WB stage latch 3a. Similarly, the operation result in the second EX stage arithmetic unit 2b is stored in the register file 1 through the second MEM stage latch 4b, second selective circuit 5b and second WB stage latch 3b.

In the pipeline processor according to the second prior art, when the first instruction to be executed earlier and the second instruction to be executed next thereto are operation instructions and there is the data dependent relationship between the first and second instructions, that is, the operation result of the first instruction is used according to the second instruction, i.e., operation instruction, the operation result of the first instruction is inputted to the second EX stage arithmetic unit 2b through a bypass path 7a. A memory unit is indicated at 9.

FIG. 12 is a diagram showing the operation of the pipeline processor according to the second prior art. In FIG. 12, the first instruction to be executed earlier is an addition instruction ADD. The addition instruction ADD stores, in a register r3, the sum of data stored in a register r1 and data stored in a register r2. The second instruction to be executed next to the first instruction is a subtraction instruction SUB. The subtraction instruction SUB subtracts data stored in a register r4 from data stored in the register r3, and stores the operation result in a register r5. Since data read out from the register r3 in a DEC stage of the second instruction, i.e., subtraction instruction SUB has not been reloaded by the execution of the first instruction, i.e., addition instruction ADD, it cannot be used for the operation of the second instruction, i.e., subtraction instruction SUB. The operation result of the first instruction, i.e., addition instruction ADD is stored in the register r3 in a WB stage of the first instruction. The operation result is transferred to the second EX stage arithmetic unit 2b in an EX stage of the first instruction, i.e., addition instruction ADD which has not been stored in the register r3. However, an EX stage for executing the operation of the second instruction, i.e., subtraction instruction SUB is delayed by 1 cycle. Herein, a stage for waiting for operations to be executed is indicated at STALL.

(Third Prior Art)

The third prior art provides a pipeline processor for dividing a first instruction and a second instruction to be executed next thereto into a plurality of stages so as to simultaneously pipeline first and second instructions, in which the first instruction is a load instruction LD and the second instruction is an addition instruction ADD.

FIG. 13 is a block diagram showing a pipeline processor according to the third prior art. In FIG. 13, the pipeline processor according to the third prior art comprises first and second arithmetic units 6c and 6d. The first arithmetic unit 6c pipelines a first instruction to be executed earlier, and the second arithmetic unit 6d pipelines a second instruction to be executed next to the first instruction at the same time. The first arithmetic unit 6c includes a first EX stage arithmetic unit 2a, a first MEM stage latch 4a, a first selective circuit 5a and a first WB stage latch 3a. Similarly, the second arithmetic unit 6d includes a second EX stage arithmetic unit 2b, a second MEM stage latch 4b, a second selective circuit 5b and a second WB stage latch 3b.

The pipeline processor according to the third prior art comprises a register file 1 which is shared by the first and second arithmetic units 6c and 6d. The register file 1 includes a lot of registers 1a, 1b, 1c, 1d . . . Herein, it is supposed that data stored in the registers 1a and 1b are used for the operation of the first instruction in the first EX stage arithmetic unit 2a, and data stored in the registers 1c and 1d are used for the operation of the second instruction in the second EX stage arithmetic unit 2b. The operation result in the first EX stage arithmetic unit 2a is stored in the register file 1 through the first MEM stage latch 4a, first selective circuit 5a and first WB stage latch 3a. Similarly, the operation result in the second EX stage arithmetic unit 2b is stored in the register file 1 through the second MEM stage latch 4b, second selective circuit 5b and second WB stage latch 3b.

In the pipeline processor according to the third prior art, when the first instruction to be executed earlier is a load instruction LD, the second instruction to be executed next thereto is an operation instruction and there is the data dependent relationship between the first and second instructions, that is, load data to be loaded from a memory unit 9 according to the first instruction, i.e., load instruction LD is used according to the second instruction, i.e., operation instruction, the load data read out from the memory unit 9 according to the first instruction, i.e., load instruction LD is inputted to the second EX stage arithmetic unit 2b through a bypass path 8a.

FIG. 14 is a diagram showing the operation of the pipeline processor according to the third prior art. In FIG. 14, the first instruction to be executed earlier is a load instruction LD. The load instruction LD specifies the sum of data stored in a register r1 and data stored in a register r2 as an address of the memory unit 9 to read out data stored in the address from the memory unit 9, and stores load data read out from the memory unit 9 in a register r3. The second instruction to be executed next to the first instruction is an addition instruction ADD. The addition instruction ADD adds data stored in the register r3 and data stored in a register r4, and stores the operation result in a register r5. Since data read out from the register r3 in a DEC stage of the second instruction, i.e., addition instruction ADD has not been reloaded by the execution of the first instruction, i.e., load instruction LD, it cannot be used for the operation of the second instruction, i.e., addition instruction ADD. Load data obtained by executing the first instruction, i.e., load instruction LD is stored in the register r3 in a WB stage of the first instruction. The load data read out from the memory unit 9 in a MEM stage of the first instruction which has not been stored in the register r3 is transferred to the second EX stage arithmetic unit 2b. However, an EX stage for executing the operation of the second instruction, i.e., addition instruction ADD is delayed by two cycles. Herein, a stage for waiting for operations to be executed is indicated at STALL.

(Fourth Prior Art)

The fourth prior art provides a pipeline processor for dividing a first instruction and a second instruction to be executed next thereto into a plurality of stages so as to simultaneously pipeline first and second instructions, in which the first instruction is a multiplication instruction MUL and the second instruction is an addition instruction ADD. The multiplication instruction MUL needs two cycles for executing its operation.

FIG. 15 is a block diagram showing a pipeline processor according to the fourth prior art. In FIG. 15, the pipeline processor according to the fourth prior art comprises first and second arithmetic units 6e and 6f. The first arithmetic unit 6e pipelines a first instruction to be executed earlier, and the second arithmetic unit 6f pipelines a second instruction to be executed next to the first instruction at the same time. The first arithmetic unit 6e includes a multiplier 2c, a first selective circuit 5a and a first WB stage latch 3a. The second arithmetic unit 6f includes an EX stage arithmetic unit 2b, a MEM stage latch 4b, a second selective circuit 5b and a second WB stage latch 3b.

The pipeline processor according to the fourth prior art comprises a register file 1 which is shared by the first and second arithmetic units 6e and 6f. The register file 1 includes a lot of registers 1a, 1b, 1c, 1d . . . Herein, it is supposed that data stored in the registers 1a and 1b are used for the operation of the first instruction in the multiplier 2c, and data stored in the registers 1c and 1d are used for the operation of the second instruction in the EX stage arithmetic unit 2b. The operation result in the multiplier 2c is stored in the register file 1 through the first selective circuit 5a and first WB stage latch 3a. The operation result in the EX stage arithmetic unit 2b is stored in the register file 1 through the MEM stage latch 4b, second selective circuit 5b and second WB stage latch 3b.

In the pipeline processor according to the fourth prior art, when the first instruction to be executed earlier is a multiplication instruction MUL, the second instruction to be executed next thereto is an operation instruction and there is the data dependent relationship between the first and second instructions, that is, the operation result of the first instruction, i.e., multiplication instruction MUL is used according to the second instruction, i.e., operation instruction, the operation result of the first instruction, i.e., multiplication instruction MUL is inputted to the EX stage arithmetic unit 2b through a bypass path 8a. A memory unit is indicated at 9.

FIG. 16 is a diagram showing the operation of the pipeline processor according to the fourth prior art. In FIG. 16, the first instruction to be executed earlier is a multiplication instruction MUL. The multiplication instruction MUL stores, in a register r3, the product of data stored in a register r1 and data stored in a register r2. The second instruction to be executed next to the first instruction is an addition instruction ADD. The addition instruction ADD adds data stored in the register r3 and data stored in a register r4, and stores the operation result in a register r5. Since data read out from the register r3 in a DEC stage of the second instruction, i.e., addition instruction ADD has not been reloaded by the execution of the first instruction, i.e., multiplication instruction MUL, it cannot be used for the operation of the second instruction, i.e., addition instruction ADD. The operation result of the first instruction, i.e., multiplication instruction MUL is stored in the register r3 in a WB stage of the first instruction. Before stored in the register r3, the operation result is transferred to the EX stage arithmetic unit 2b. However, an EX stage for executing the operation of the second instruction, i.e., addition instruction ADD is delayed by two cycles. Stages EX1 and EX2 of the first instruction, i.e., multiplication instruction MUL are 2-cycle execution stages. A stage for waiting for operations to be executed is indicated at STALL.

In the pipeline processors according to the above-mentioned prior art, when there is the data dependent relationship between a first instruction and a second instruction to be executed next thereto, the execution of the second instruction is waited for. Consequently, a processing speed is lowered.

SUMMARY OF THE INVENTION

In view of the above-mentioned problems, it is an object of the present invention to provide a pipeline processor capable of reducing the time for waiting for a second instruction to be executed even if there is the data dependent relationship, also referred to as a data dependence relationship, between a first instruction and the second instruction to be executed next thereto.

To achieve the above-mentioned object, the present invention provides a pipeline processor for dividing a first instruction and a second instruction to be executed next thereto into a plurality of stages so as to carry out pipeline processing, comprising stage arithmetic means for executing the operation of the second instruction in a stage subsequent to an execution stage of the second instruction, data dependence detecting means for detecting the data dependent relationship between the first and second instructions, and control means for causing the stage arithmetic means to execute the operation of the second instruction when the data dependence detecting means detects the data dependent relationship.

With the above-mentioned structure, if there is the data dependent relationship between the first instruction and the second instruction to be executed next thereto, the data dependence detecting means can detect the data dependent relationship and the stage arithmetic means can execute the operation of the second instruction by the control of the control means in a stage subsequent to an execution stage of the second instruction. Thereby, even if the acquirement of data necessary for the operation of the second instruction is delayed due to the data dependent relationship, the operation of the second instruction can be executed in the stage subsequent to the execution stage of the second instruction. Consequently, there can be reduced the time for waiting for the second instruction to be executed. Thus, the processing speed of the pipeline processor can be enhanced.

In the case where the first instruction is a load instruction, there is the data dependent relationship between the first and second instructions in which load data to be loaded according to the first instruction is used for the operation of the second instruction. When the data dependent relationship is detected by the data dependence detecting means, the load data to be loaded according to the first instruction is also inputted to the stage arithmetic means. The stage arithmetic means can execute the operation of the second instruction in the stage subsequent to the execution stage of the second instruction. Consequently, it is possible to execute, together with the first instruction, the second instruction which has no stage for waiting for execution and uses the load data to be loaded according to the first instruction. Thus, the processing speed of the pipeline processor can remarkably be enhanced.

In the case where the first instruction is a load instruction and the stage arithmetic means is write stage arithmetic means for executing the operation of the second instruction in a write stage subsequent to the execution stage of the second instruction, the operation of the second instruction which uses the load data to be loaded according to the first instruction can be executed in the write stage subsequent to the execution stage of the second instruction. Consequently, it is possible to execute the operation of the second instruction having no stage for waiting for execution. Thus, the processing speed of the pipeline processor can remarkably be enhanced.

To achieve the above-mentioned object, the present invention further provides a pipeline processor for dividing a first instruction and a second instruction to be executed next thereto into a plurality of stages so as to simultaneously pipeline first and second instructions, comprising a first arithmetic unit for pipelining the first instruction, a second arithmetic unit for pipelining the second instruction, data dependence detecting means for detecting the data dependent relationship between the first and second instructions, and control means, wherein the second arithmetic unit includes stage arithmetic means for executing the operation of the second instruction in a stage subsequent to an execution stage of the second instruction, and the control means causes the stage arithmetic means to execute the operation of the second instruction when the data dependence detecting unit detects the data dependent relationship.

With the above-mentioned structure, if there is the data dependent relationship between the first instruction and the second instruction to be executed next thereto, the data dependence detecting means can detect the data dependent relationship and the stage arithmetic means of the second arithmetic unit can execute the operation of the second instruction by the control of the control means in a stage subsequent to an execution stage of the second instruction. Thereby, even if the acquirement of data necessary for the operation of the second instruction is delayed due to the data dependent relationship, the operation of the second instruction can be executed in the stage subsequent to the execution stage of the second instruction. Consequently, there can be reduced the time for waiting for the second instruction to be executed. Thus, the processing speed of the pipeline processor can be enhanced.

In the case where the first instruction is a load instruction, there is the data dependent relationship between the first and second instructions in which load data to be loaded to the first arithmetic unit according to the first instruction is used for the operation of the second instruction. When the data dependent relationship is detected by the data dependence detecting means, the load data to be loaded to the first arithmetic unit according to the first instruction is also inputted to the stage arithmetic means of the second arithmetic unit. The stage arithmetic means can execute the operation of the second instruction in the stage subsequent to the execution stage of the second instruction. Consequently, it is possible to execute, simultaneously with the first instruction, the second instruction which has no stage for waiting for execution and uses the load data to be loaded to the first arithmetic unit according to the first instruction. Thus, the processing speed of the pipeline processor can remarkably be enhanced.

In the case where the first instruction is a load instruction and the stage arithmetic means is write stage arithmetic means for executing the operation of the second instruction in a write stage subsequent to the execution stage of the second instruction, the operation of the second instruction which uses the load data to be loaded to the first arithmetic unit according to the first instruction can be executed in the write stage subsequent to the execution stage of the second instruction. Consequently, it is possible to execute, simultaneously with the first instruction, the operation of the second instruction having no stage for waiting for execution. Thus, the processing speed of the pipeline processor can remarkably be enhanced.

This and other objects, features and advantages of the present invention will become more apparent upon a reading of the following detailed description and drawings.

DETAILED DESCRIPTION OF THE PREFERRED EMBODIMENTS

Four embodiments of the present invention will be described with reference to the drawings.

(First Embodiment)

A first embodiment of the present invention provides a pipeline processor for dividing a first instruction and a second instruction to be executed next thereto into a plurality of stages so as to carry out pipeline processing, comprising a memory stage arithmetic unit (MEM stage arithmetic unit) for executing the operation of the second instruction in a memory stage (MEM stage) subsequent to an execution stage (EX stage) of the second instruction. The first instruction is a load instruction LD, and the second instruction is a subtraction instruction SUB.

Figure 1:
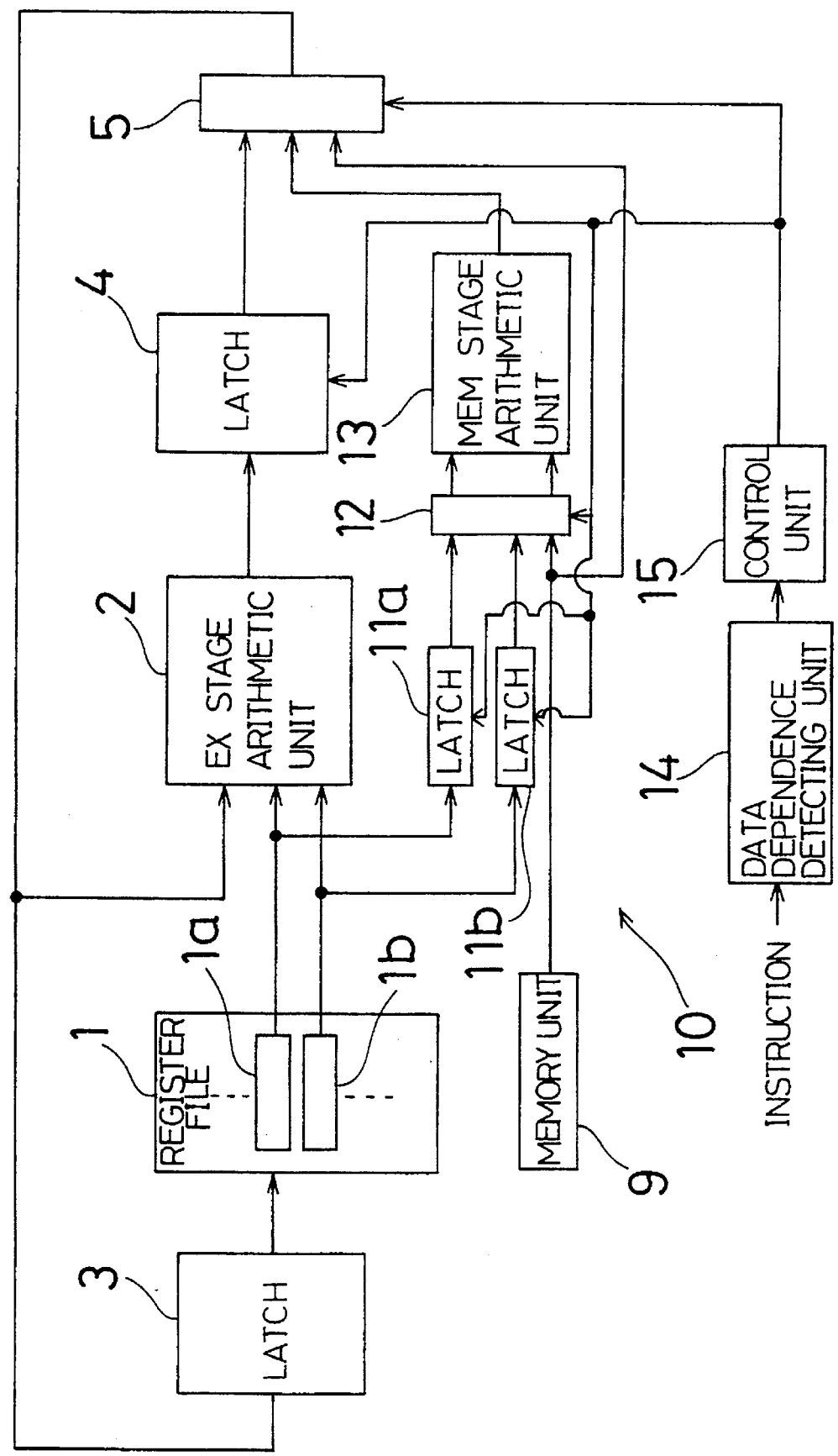
FIG. 1 is a block diagram showing a pipeline processor according to a first embodiment of the present invention.

FIG. 1 is a block diagram showing a pipeline processor according to the first embodiment of the present invention. In FIG. 1, the pipeline processor according to the first embodiment comprises an arithmetic unit 10. The arithmetic unit 10 pipelines first and second instructions, and includes an EX stage arithmetic unit 2, a MEM stage latch 4, a first selective circuit 5, a WB stage latch 3, first and second EX stage latches 11a and 11b, a second selective circuit 12, and a MEM stage arithmetic unit 13.

The pipeline processor according to the first embodiment comprises a register file 1 to be used by the arithmetic unit 10. The register file 1 includes a lot of registers 1a, 1b . . . Data stored in the registers 1a and 1b are used for the operations of the first and second instructions in the EX stage arithmetic unit 2, respectively.

Furthermore, the pipeline processor according to the first embodiment comprises a data dependence detecting unit 14 and a control unit 15. In the case where the first instruction is a load instruction LD and the second instruction is an operation instruction such as a subtraction instruction SUB, the data dependence detecting unit 14 sends a detection signal to the control unit 15 if it detects that there is the data dependent relationship between the first and second instructions, that is, load data to be loaded from a memory unit 9 according to the first instruction, i.e., load instruction LD is used for the operation of the second instruction, i.e., operation instruction. When the detection signal is inputted from the data dependence detecting unit 14, the control unit 15 outputs a control signal to the first and second EX stage latches 11a and 11b, the MEM stage latch 4, the first and second selective circuits 5 and 12, and the like.

Figure 2:
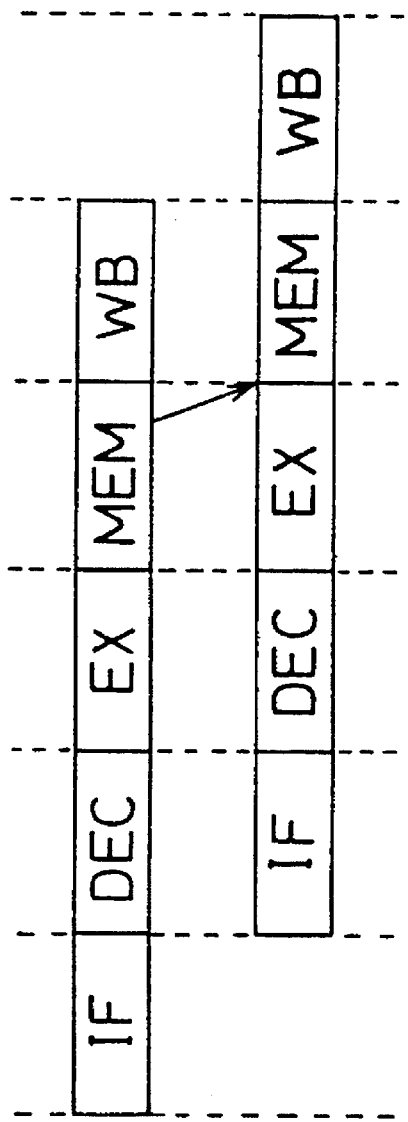
FIG. 2 is a diagram showing the operation of the pipeline processor according to the first embodiment of the present invention.

FIG. 2 is a diagram showing the operation of the pipeline processor according to the first embodiment of the present invention. In FIG. 2, the first instruction to be executed earlier is a load instruction LD. The load instruction LD specifies data stored in a register r1 as an address of the memory unit 9 to read out data stored in the address from the memory unit 9, and stores, in a register r2, load data read out from the memory unit 9. The second instruction to be executed next to the first instruction is a subtraction instruction SUB. The subtraction instruction SUB subtracts data stored in a register r3 from the data stored in the register r2, and stores the operation result in a register r4. In the pipeline processor according to the first embodiment, the load data read out from the memory unit 9 according to the first instruction, i.e., load instruction LD is stored in the register r2 and is also used for the operation of the second instruction, i.e., subtraction instruction SUB.

As described above, the pipeline processor according to the first embodiment executes the first and second instructions. The arithmetic unit 10 reads out the first instruction in an IF stage of the first instruction, and decodes that the first instruction is a load instruction LD in a DEC stage thereof. In a MEM stage of the first instruction, consequently, the data stored in the register r1 is specified as an address of the memory unit 9. Data stored in the address is read out from the memory unit 9. Load data read out from the memory unit 9 is inputted to the WB stage latch 3 and MEM stage arithmetic unit 13. In a WB stage of the first instruction, the load data read out from the memory unit 9 is stored in the register file 1.

Similarly, the arithmetic unit 10 reads out the second instruction in an IF stage of the second instruction, and decodes that the second instruction is a subtraction instruction SUB in a DEC stage thereof. The first and second instructions are also inputted to the data dependence detecting unit 14, respectively. The data dependence detecting unit 14 checks whether there is the data dependent relationship between the first and second instructions, that is, the load data to be loaded from the memory unit 9 by executing the first instruction, i.e., load instruction LD is used for the operation of the second instruction, i.e., subtraction instruction SUB. When the data dependence detecting unit 14 detects that there is the data dependent relationship between the first and second instructions, i.e., the load instruction LD and the subtraction instruction SUB, it outputs a detection signal to the control unit 15. In the case where there is the data dependent relationship between the first and second instructions, only the data stored in the register 1b of the register file 1 is read out by the second EX stage latch 11b in the DEC stage of the second instruction.

In an EX stage of the second instruction, subtraction is not executed. In a MEM stage of the second instruction, the data read out by the second EX stage latch 11b is inputted to the MEM stage arithmetic unit 13 through the second selective circuit 12. As described above, the load data read out from the memory unit 9 is inputted to the MEM stage arithmetic unit 13 in the MEM stage of the first instruction. Accordingly, the MEM stage arithmetic unit 13 executes subtraction so that the operation result of the second instruction, i.e., subtraction instruction SUB is obtained in the MEM stage of the second instruction. In a WB stage of the second instruction, the operation result of the second instruction, i.e., subtraction instruction SUB is stored in the register file 1.

In the pipeline processor according to the first embodiment, in the case where the first instruction is a load instruction LD and the second instruction is a subtraction instruction SUB, the load data to be loaded from the memory unit 9 according to the first instruction is also inputted to the MEM stage arithmetic unit 13 when the data dependence detecting unit 14 detects the data dependent relationship that the load data to be loaded from the memory unit 9 according to the first instruction is used for the operation of the second instruction. The MEM stage arithmetic unit 13 executes the subtraction of the second instruction in the MEM stage subsequent to the EX stage of the second instruction. Consequently, there is not needed a stage for waiting for the second instruction to be executed.

In the case where the pipeline processor comprises a write stage arithmetic unit (WB stage arithmetic unit) for executing the operation of the second instruction in a write stage (WB stage) subsequent to an execution stage (EX stage) of the second instruction in place of the memory stage arithmetic unit (MEM stage arithmetic unit) of the pipeline processor according to the first embodiment, the WB stage arithmetic unit executes the subtraction of the second instruction in the WB stage subsequent to the EX stage of the second instruction. Consequently, there is not needed a stage for waiting for the second instruction to be executed.

(Second Embodiment)

A second embodiment of the present invention provides a pipeline processor for dividing a first instruction and a second instruction to be executed next thereto into a plurality of stages so as to simultaneously pipeline first and second instructions, comprising a memory stage arithmetic unit (MEM stage arithmetic unit) for executing the operation of the second instruction in a memory stage (MEM stage) subsequent to an execution stage (EX stage) of the second instruction. The first instruction is an addition instruction ADD, and the second instruction is a subtraction instruction SUB.

Figure 3:
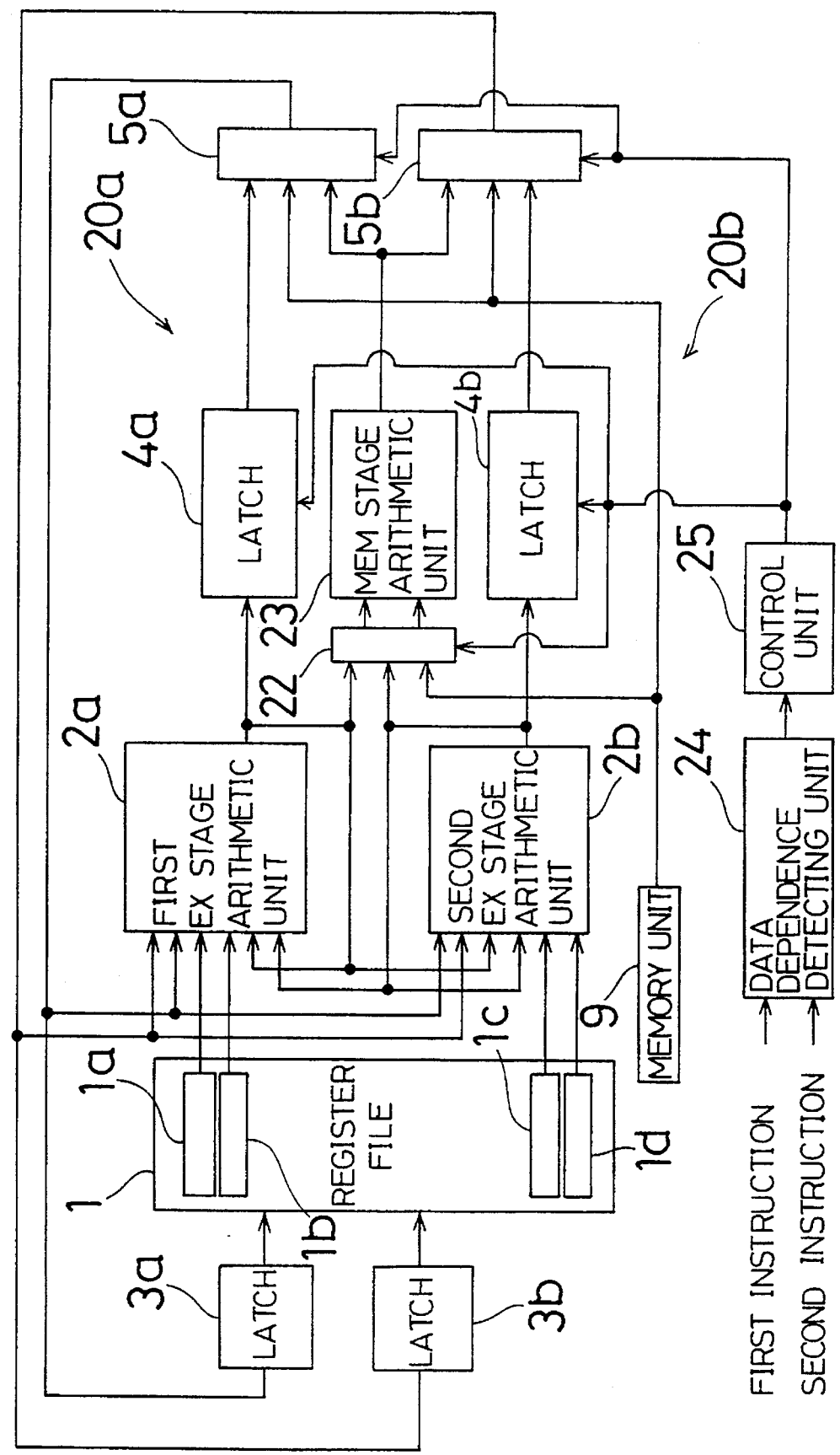
FIG. 3 is a block diagram showing a pipeline processor according to a second embodiment of the present invention.

FIG. 3 is a block diagram showing a pipeline processor according to the second embodiment of the present invention. In FIG. 3, the pipeline processor according to the second embodiment comprises first and second arithmetic units 20a and 20b. The first arithmetic unit 20a pipelines a first instruction, and the second arithmetic unit 20b pipelines a second instruction at the same time. The first arithmetic unit 20a includes a first EX stage arithmetic unit 2a, a first MEM stage latch 4a, a first selective circuit 5a and a first WB stage latch 3a. The second arithmetic unit 20b includes a second EX stage arithmetic unit 2b, a second MEM stage latch 4b, a second selective circuit 5b, a second WB stage latch 3b, a third selective circuit 22 and a MEM stage arithmetic unit 23.

The pipeline processor according to the second embodiment comprises a register file 1 which is shared by the first and second arithmetic units 20a and 20b. The register file 1 includes a lot of registers 1a, 1b, 1c, 1d . . . Herein, it is supposed that-data stored in the registers 1a and 1b are used for the operation of the first instruction in the first EX stage arithmetic unit 2a, and data stored in the registers 1c and 1d are used for the operation of the second instruction in the second EX stage arithmetic unit 2b.

The pipeline processor according to the second embodiment comprises a data dependence detecting unit 24 and a control unit 25. In the case where the first and second instructions are operation instructions, the data dependence detecting unit 24 sends a detection signal to the control unit 25 when it detects that there is the data dependent relationship between the first and second instructions, that is, the operation result of the first instruction is used for the operation of the second instruction. When the detection signal is inputted from the data dependence detecting unit 24, the control unit 25 outputs a control signal to the first and second MEM stage latches 4a and 4b, the first, second and third selective circuits 5a, 5b and 22, and the like. A memory unit is indicated at 9.

Figure 4:
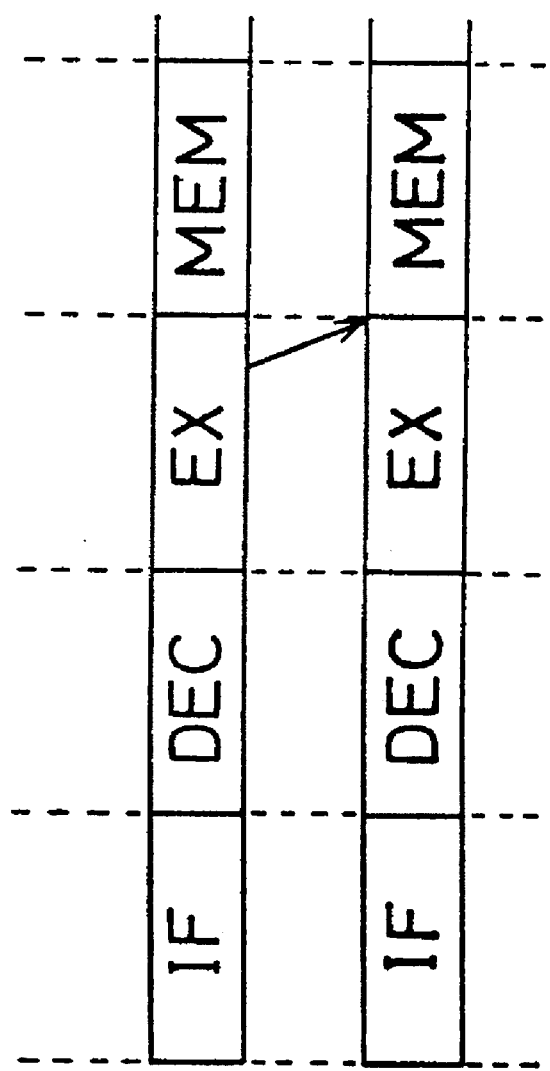
FIG. 4 is a diagram showing the operation of the pipeline processor according to the second embodiment of the present invention.

FIG. 4 is a diagram showing the operation of the pipeline processor according to the second embodiment of the present invention. In FIG. 4, the first instruction to be executed earlier is an addition instruction ADD. The addition instruction ADD stores, in a register r3, the sum of data stored in a register r1 and data stored in a register r2. The second instruction to be executed next to the first instruction is a subtraction instruction SUB. The subtraction instruction SUB subtracts data stored in a register r4 from the data stored in the register r3, and stores the operation result in a register r5. In the pipeline processor according to the second embodiment, the operation result of the first instruction, i.e., addition instruction ADD is stored in the register r3 and is also used for the operation of the second instruction, i.e., subtraction instruction SUB.

As described above, the pipeline processor according to the second embodiment executes the first and second instructions simultaneously. In an IF stage of the first instruction, the first arithmetic unit 20a reads out the first instruction. In a DEC stage of the first instruction, the first arithmetic unit 20a decodes that the first instruction is an addition instruction ADD and inputs data stored in the registers 1a and 1b of the register file 1 to the first EX stage arithmetic unit 2a, respectively. In an EX stage of the first instruction, the first EX stage arithmetic unit 2a of the first arithmetic unit 20a adds data read out from the registers 1a and 1b of the register file 1 together. The operation result is inputted to the MEM stage arithmetic unit 23 through the first MEM stage latch 4a and the third selective circuit 22. The operation result of the addition instruction ADD inputted to the first MEM stage latch 4a is stored in the register file 1 in a WB stage of the first instruction.

Similarly, the second arithmetic unit 20b reads out the second instruction in an IF stage of the second instruction, and decodes that the second instruction is a subtraction instruction SUB in a DEC stage thereof. The first and second instructions are also inputted to the data dependence detecting unit 24, respectively. The data dependence detecting unit 24 checks whether there is the data dependent relationship between the first and second instructions, that is, the operation result obtained by executing the first instruction, i.e., addition instruction ADD is used for the operation of the second instruction, i.e., subtraction instruction SUB. When the data dependence detecting unit 24 detects that there is the data dependent relationship between the first and second instructions, i.e., the addition instruction ADD and the subtraction instruction SUB, it outputs a detection signal to the control unit 25. In the case where there is the data dependent relationship between the first and second instructions, only the data stored in the register 1d of the register file 1 is read out by the second EX stage arithmetic unit 2b in the DEC stage of the second instruction.

In an EX stage of the second instruction, the operation of the second instruction, i.e., subtraction instruction SUB is not executed, and the data read out from the register 1d of the register file 1 is inputted to the MEM stage arithmetic unit 23. As described above, the operation result of the first instruction, i.e., addition instruction ADD is inputted to the MEM stage arithmetic unit 23 in the EX stage of the first instruction. In the MEM stage of the second instruction, accordingly, the MEM stage arithmetic unit 23 executes subtraction so that the operation result of the second instruction, i.e., subtraction instruction SUB is obtained. In a WB stage of the second instruction, the operation result of the second instruction, i.e., subtraction instruction SUB is stored in the register file 1.

In the pipeline processor according to the second embodiment, in the case where the first instruction is an addition instruction ADD and the second instruction is a subtraction instruction SUB, the operation result obtained by executing the first instruction is also inputted to the MEM stage arithmetic unit 23 of the second arithmetic unit 20b when the data dependence detecting unit 24 detects the data dependent relationship that the operation result of the first instruction is used for the operation of the second instruction. The MEM stage arithmetic unit 23 executes the subtraction of the second instruction in the MEM stage subsequent to the EX stage of the second instruction. Consequently, there is not needed a stage for waiting for the second instruction to be executed.

(Third Embodiment)

A third embodiment of the present invention provides a pipeline processor for dividing a first instruction and a second instruction to be executed next thereto into a plurality of stages so as to simultaneously pipeline first and second instructions, comprising a write stage arithmetic unit (WB stage arithmetic unit) for executing the operation of the second instruction in a write stage (WB stage) subsequent to an execution stage (EX stage) of the second instruction. The first instruction is a load instruction LD, and the second instruction is an addition instruction ADD.

Figure 5:
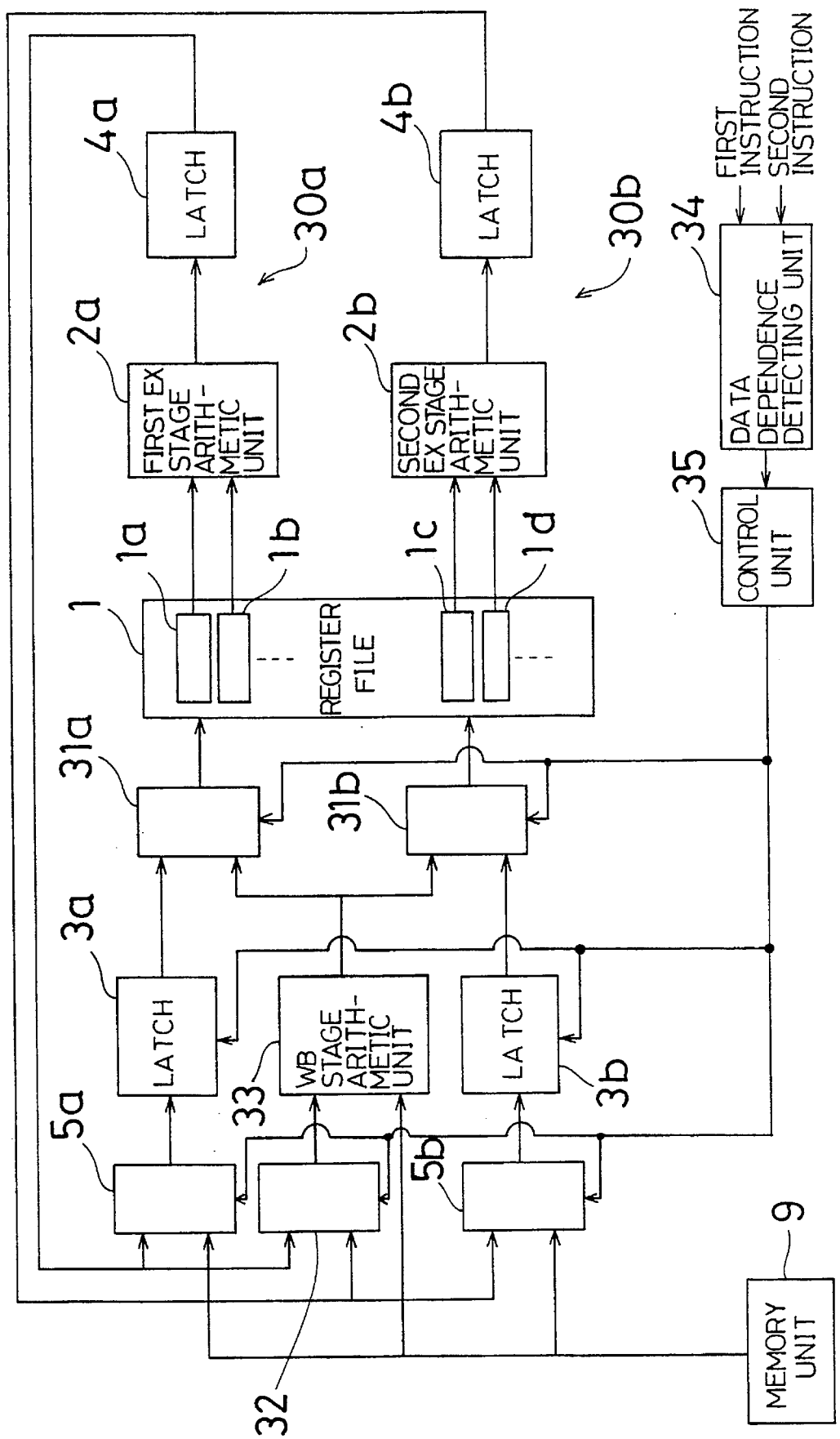
FIG. 5 is a block diagram showing a pipeline processor according to a third embodiment of the present invention.

FIG. 5 is a block diagram showing a pipeline processor according to the third embodiment of the present invention. In FIG. 5, the pipeline processor according to the third embodiment comprises first and second arithmetic units 30a and 30b. The first arithmetic unit 30a pipelines a first instruction, and the second arithmetic unit 30b pipelines a second instruction at the same time. The first arithmetic unit 30a includes a first EX stage arithmetic unit 2a, a first MEM stage latch 4a, a first selective circuit 5a, a first WB stage latch 3a and a third selective circuit 31a. The second arithmetic unit 30b includes a second EX stage arithmetic unit 2b, a second MEM stage latch 4b, a second selective circuit 5b, a second WB stage latch 3b, a fourth selective circuit 31b, a fifth selective circuit 32 and a WB stage arithmetic unit 33.

The pipeline processor according to the third embodiment comprises a register file 1 which is shared by the first and second arithmetic units 30a and 30b. The register file 1 includes a lot of registers 1a, 1b, 1c, 1d . . . Herein, it is supposed that data stored in the registers 1a and 1b are used for the operation of the first instruction in the first EX stage arithmetic unit 2a, and data stored in the registers 1c and 1d are used for the operation of the second instruction in the second EX stage arithmetic unit 2b.

The pipeline processor according to the third embodiment comprises a data dependence detecting unit 34 and a control unit 35. In the case where the first instruction is a load instruction LD and the second instruction is an operation instruction such as an addition instruction ADD, the data dependence detecting unit 34 sends a detection signal to the control unit 35 when it detects that there is the data dependent relationship between the first and second instructions, that is, load data to be loaded from a memory unit 9 according to the first instruction, i.e., load instruction LD is used for the operation of the second instruction, i.e., operation instruction. When the detection signal is inputted from the data dependence detecting unit 34, the control unit 35 outputs a control signal to the first and second WB stage latches 3a and 3b, the first, second, third, fourth and fifth selective circuits 5a, 5b, 31a, 31b and 32, and the like.

Figure 6:
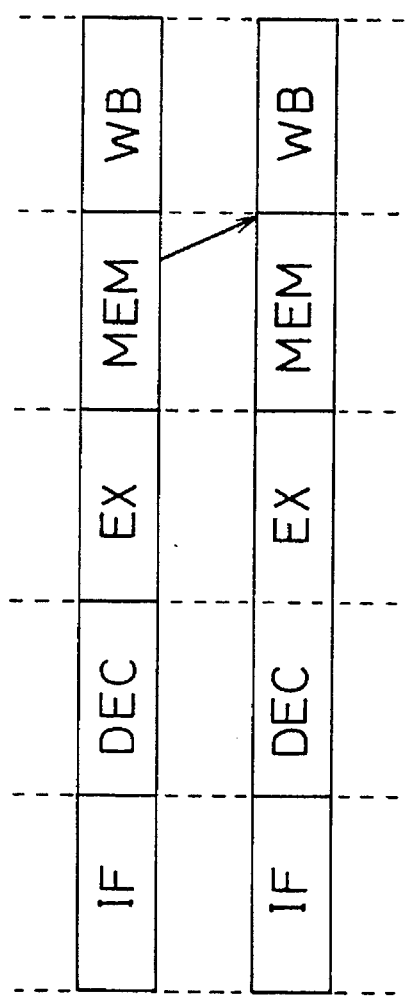
FIG. 6 is a diagram showing the operation of the pipeline processor according to the third embodiment of the present invention.

FIG. 6 is a diagram showing the operation of the pipeline processor according to the third embodiment of the present invention. In FIG. 6, the first instruction to be executed earlier is a load instruction LD. The load instruction LD specifies the sum of data stored in a register r1 and data stored in a register r2 as an address of the memory unit 9 to read out data stored in the address from the memory unit 9, and stores load data read out from the memory unit 9 in a register r3. The second instruction to be executed next to the first instruction is an addition instruction ADD. The addition instruction ADD adds data stored in the register r3 and data stored in a register r4, and stores the operation result in a register r5. In the pipeline processor according to the third embodiment, the load data read out from the memory unit 9 according to the first instruction, i.e., load instruction LD is stored in the register r3 by executing the load instruction LD and is also used for the operation of the second instruction, i.e., addition Instruction ADD.

As described above, the pipeline processor according to the third embodiment executes the first and second instructions simultaneously. In an IF stage of the first instruction, the first arithmetic unit 30a reads out the first instruction. In a DEC stage of the first instruction, the first arithmetic unit 30a decodes that the first instruction is a load instruction LD and inputs data stored in the registers 1a and 1b of the register file 1 to the first EX stage arithmetic unit 2a, respectively. In an EX stage of the first instruction, the first EX stage arithmetic unit 2a of the first arithmetic unit 30a adds data read out from the registers 1a and 1b of the register file 1 together. In a MEM stage of the first instruction, the first arithmetic unit 30a specifies the operation result in the EX stage of the first instruction as an address of the memory unit 9 to read out data stored in the address of the memory unit 9 therefrom, and inputs load data read out from the memory unit 9 to the first WB stage latch 3a and WB stage arithmetic unit 33. In a WB stage of the first instruction, the load data read out from the memory unit 9 is stored in the register file 1 through the first WB stage latch 3a and third selective circuit 31a.

Similarly, the second arithmetic unit 30b reads out the second instruction in an IF stage of the second instruction, and decodes that the second instruction is an addition instruction ADD in a DEC stage thereof. The first and second instructions are also inputted to the data dependence detecting unit 34, respectively. The data dependence detecting unit 34 checks whether there is the data dependent relationship between the first and second instructions, that is, the load data read out from the memory unit 9 by executing the first instruction, i.e., load instruction LD is used for the operation of the second instruction, i.e., addition instruction ADD. When the data dependence detecting unit 34 detects that there is the data dependent relationship between the first and second instructions, i.e., the load instruction LD and the addition instruction ADD, it outputs a detection signal to the control unit 35. In the case where there is the data dependent relationship between the first and second instructions, only the data stored in the register 1d of the register file 1 is read out by the second EX stage arithmetic unit 2b in the DEC stage of the second instruction.

In an EX stage of the second instruction, addition is not executed. In a MEM stage of the second instruction, the data inputted to the second EX stage arithmetic unit 2b is inputted to the WB stage arithmetic unit 33 through the fifth selective circuit 32. As described above, the load data read out from the memory unit 9 in the MEM stage of the first instruction is inputted to the WB stage arithmetic unit 33. In a WB stage of the second instruction, accordingly, the WB stage arithmetic unit 33 executes addition so that the operation result of the second instruction, i.e., addition instruction ADD is obtained. In the WB stage of the second instruction, the operation result of the second instruction, i.e., addition instruction ADD is stored in the register file 1.

In the pipeline processor according to the third embodiment, in the case where the first instruction is a load instruction LD and the second instruction is an addition instruction ADD, the load data read out from the memory unit 9 according to the first instruction is also inputted to the WB stage arithmetic unit 33 of the second arithmetic unit 30b when the data dependence detecting unit 34 detects the data dependent relationship that the load data to be loaded from the memory unit 9 according to the first instruction is used for the operation of the second instruction. The WB stage arithmetic unit 33 executes the addition of the second instruction in the WB stage subsequent to the EX stage of the second instruction. Consequently, there is not needed a stage for waiting for the second instruction to be executed.

(Fourth Embodiment)

A fourth embodiment of the present invention provides a pipeline processor for dividing a first instruction and a second instruction to be executed next thereto into a plurality of stages so as to simultaneously pipeline first and second instructions, comprising a write stage arithmetic unit (WB stage arithmetic unit) for executing the operation of the second instruction in a write stage (WB stage) subsequent to an execution stage (EX stage) of the second instruction. The first instruction is a multiplication instruction MUL, and the second instruction is an addition instruction ADD. The multiplication instruction MUL needs two cycles for executing its operation.

Figure 7:
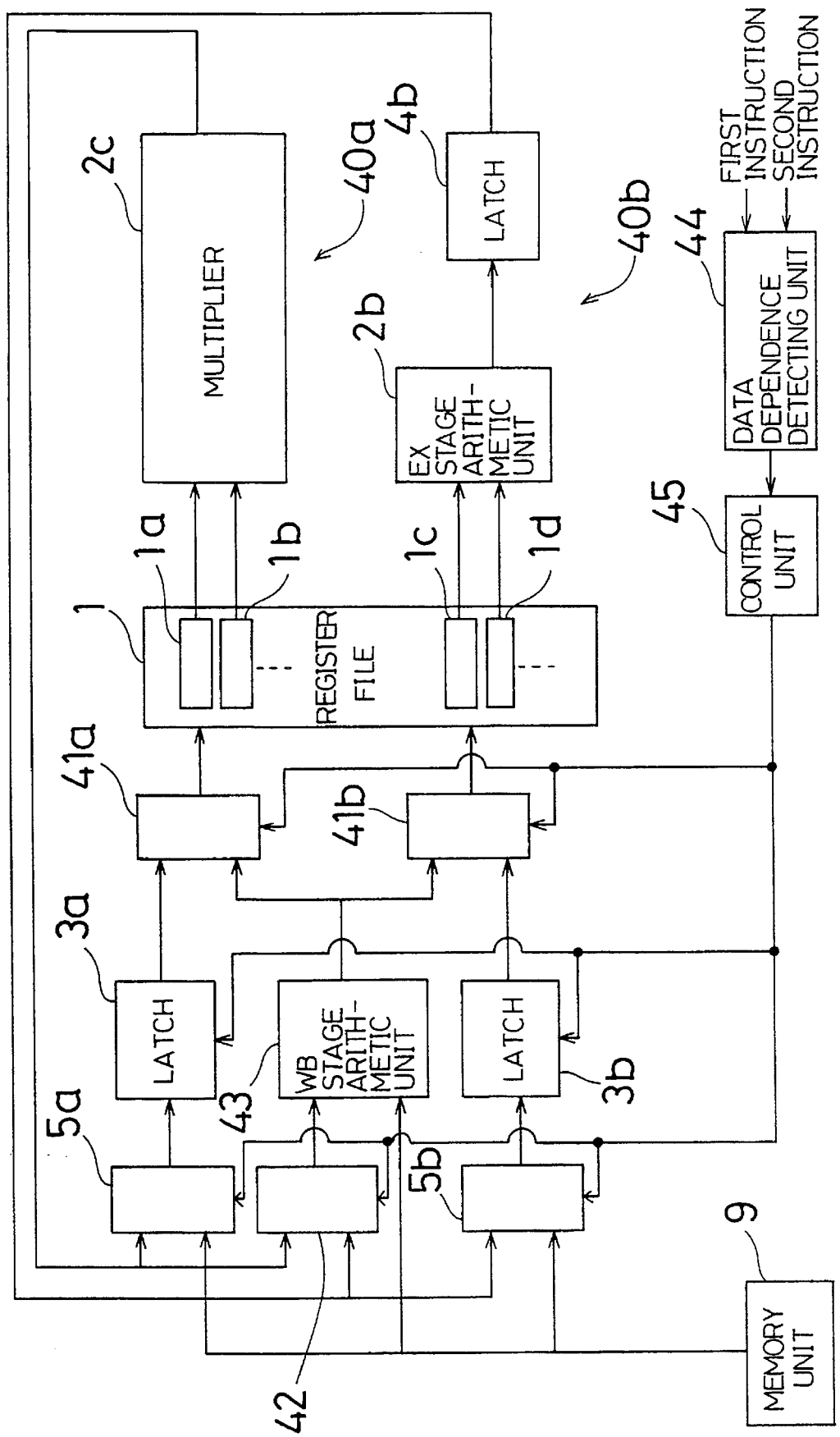
FIG. 7 is a block diagram showing a pipeline processor according to a fourth embodiment of the present invention.

FIG. 7 is a block diagram showing a pipeline processor according to the fourth embodiment of the present invention. In FIG. 7, the pipeline processor according to the fourth embodiment comprises first and second arithmetic units 40a and 40b. The first arithmetic unit 40a pipelines a first instruction, and the second arithmetic unit 40b pipelines a second instruction at the same time. The first arithmetic unit 40a includes a multiplier 2c, a first selective circuit 5a, a first WB stage latch 3a and a third selective circuit 41a. The second arithmetic unit 40b includes an EX stage arithmetic unit 2b, a MEM stage latch 4b, a second selective circuit 5b, a second WB stage latch 3b, a fourth selective circuit 41b, a fifth selective circuit 42 and a WB stage arithmetic unit 43.

The pipeline processor according to the fourth embodiment comprises a register file 1 which is shared by the first and second arithmetic units 40a and 40b. The register file 1 includes a lot of registers 1a, 1b, 1c, 1d . . . Herein, it is supposed that data stored in the registers 1a and 1b are used for the operation of the first instruction in the multiplier 2c, and data stored in the registers 1c and 1d are used for the operation of the second instruction in the EX stage arithmetic unit 2b.

The pipeline processor according to the fourth embodiment comprises a data dependence detecting unit 44 and a control unit 45. In the case where the first instruction is a multiplication instruction MUL and the second instruction is an operation instruction such as an addition instruction ADD, the data dependence detecting unit 44 sends a detection signal to the control unit 45 when it detects that there is the data dependent relationship between the first and second instructions, that is, the operation result of the first instruction, i.e., multiplication instruction MUL is used for the operation of the second instruction. When the detection signal is inputted from the data dependence detecting unit 44, the control unit 45 outputs a control signal to the first and second WB stage latches 3a and 3b, the first, second, third, fourth and fifth selective circuits 5a, 5b, 41a, 41b and 42, and the like. A memory unit is indicated at 9.

Figure 8:
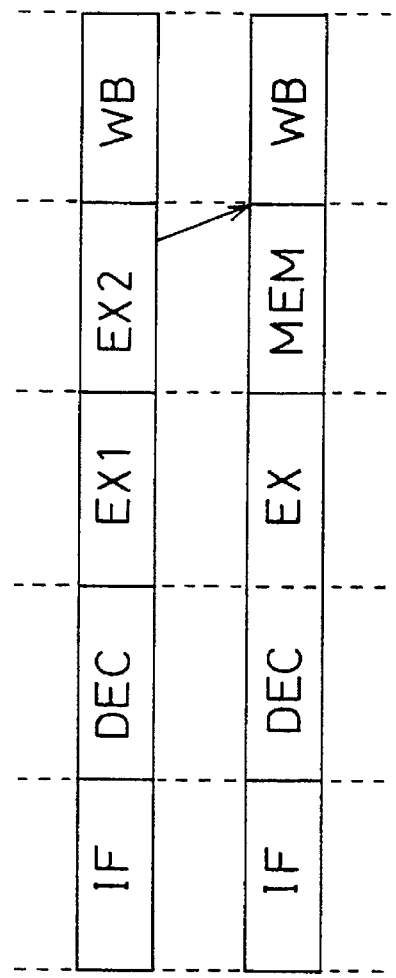
FIG. 8 is a diagram showing the operation of the pipeline processor according to the fourth embodiment of the present invention.
Figure 9:
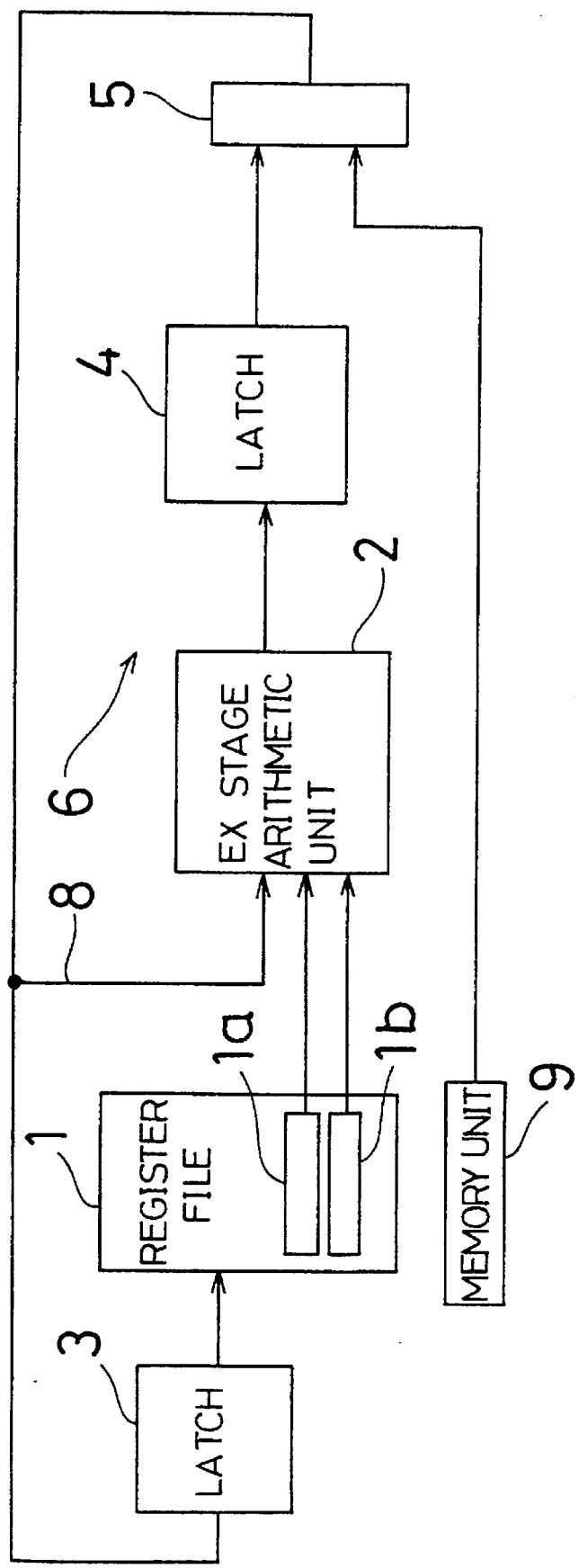
FIG. 9 is a block diagram showing a pipeline processor according to the first prior art.
Figure 10:
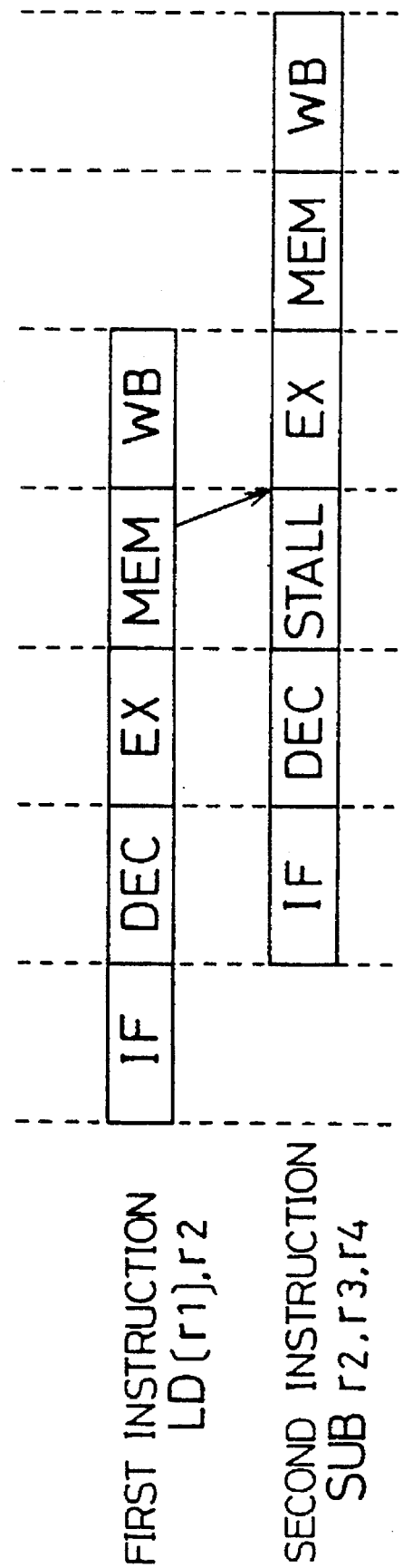
FIG. 10 is a diagram showing the operation of the pipeline processor according to the first prior art.
Figure 11:
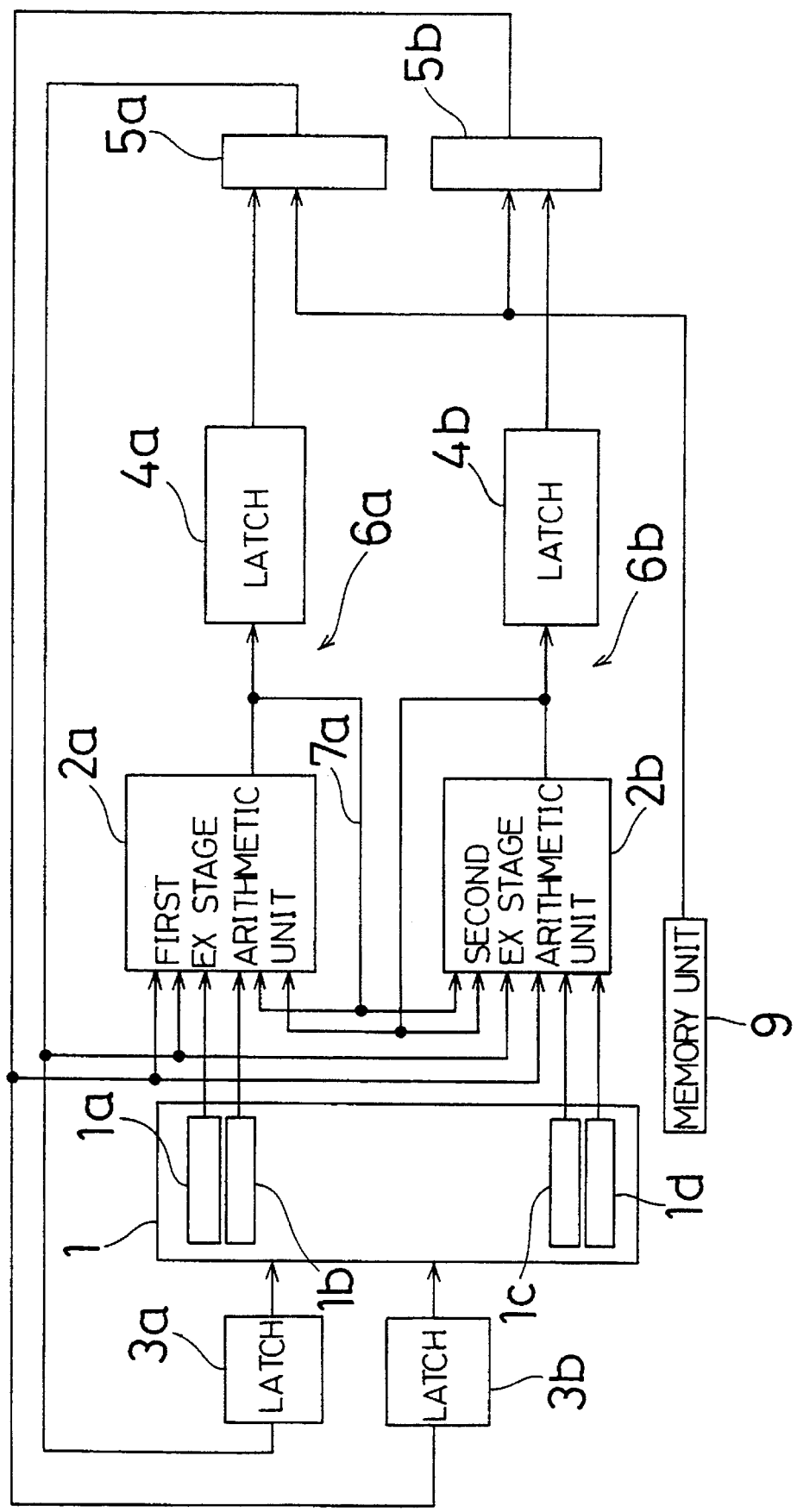
FIG. 11 is a block diagram showing a pipeline processor according to the second prior art.
Figure 12:
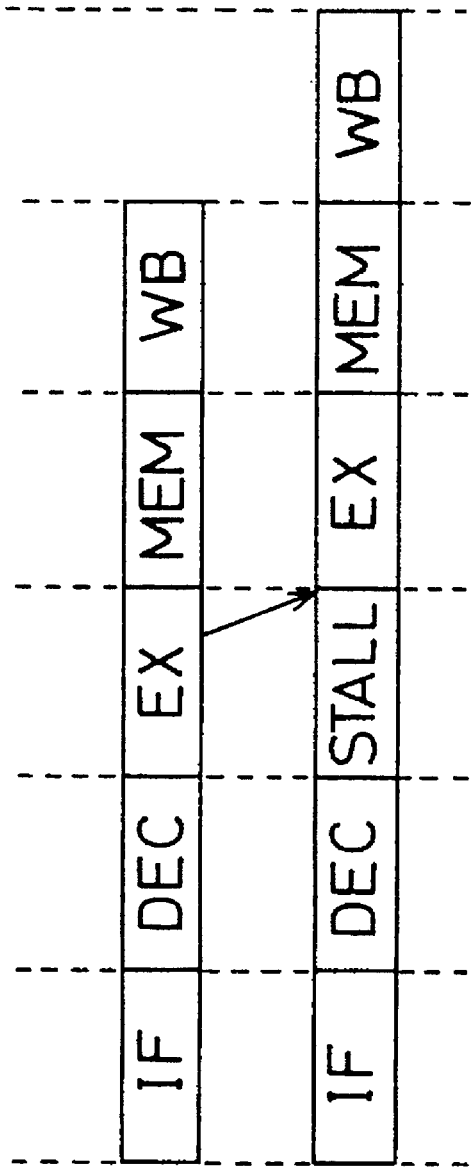
FIG. 12 is a diagram showing the operation of the pipeline processor according to the second prior art.
Figure 13:
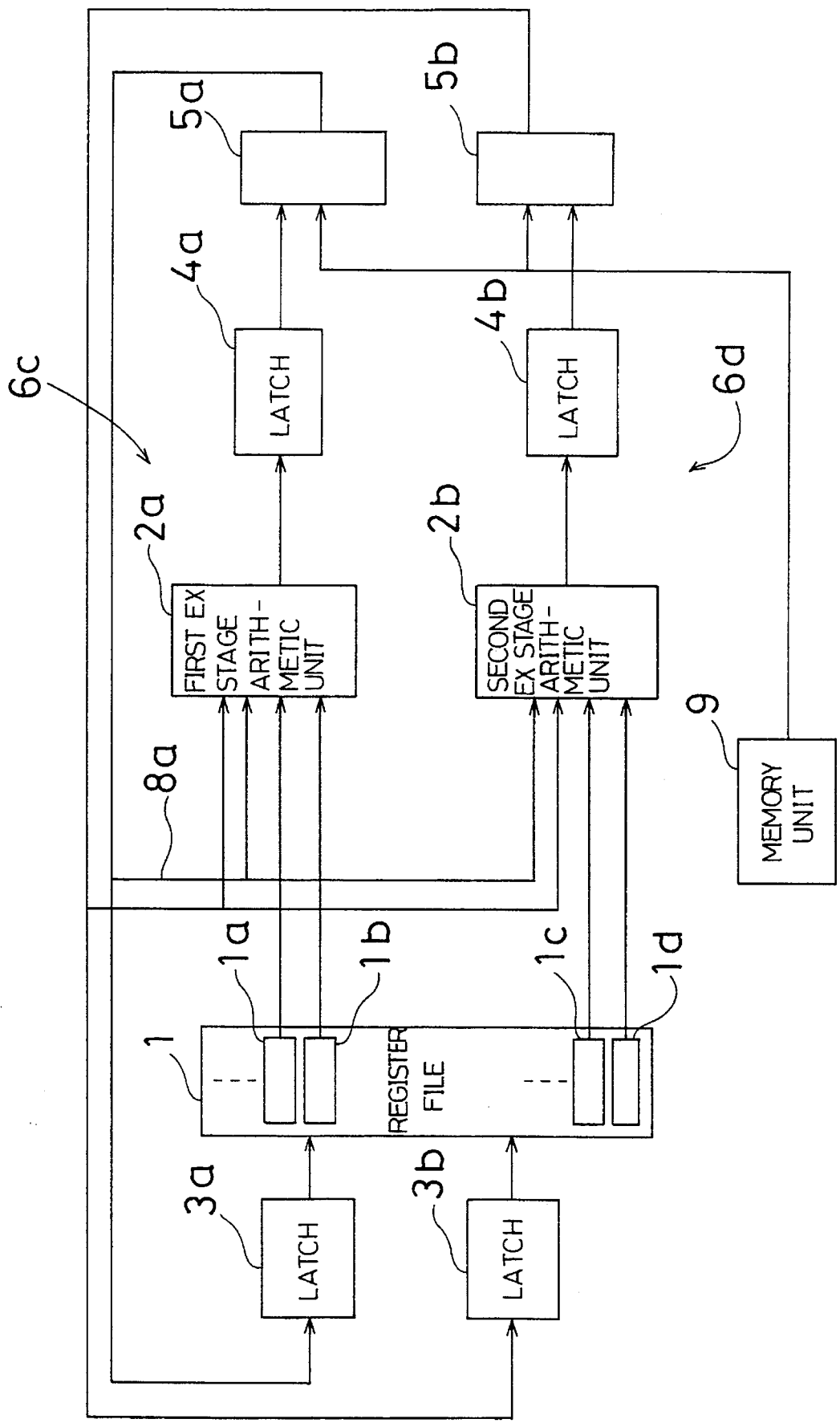
FIG. 13 is a block diagram showing a pipeline processor according to the third prior art.
Figure 14:
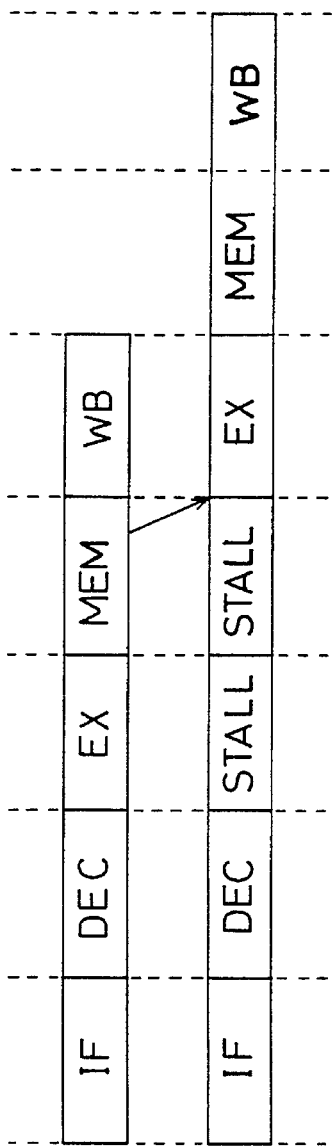
FIG. 14 is a diagram showing the operation of the pipeline processor according to the third prior art.
Figure 15:
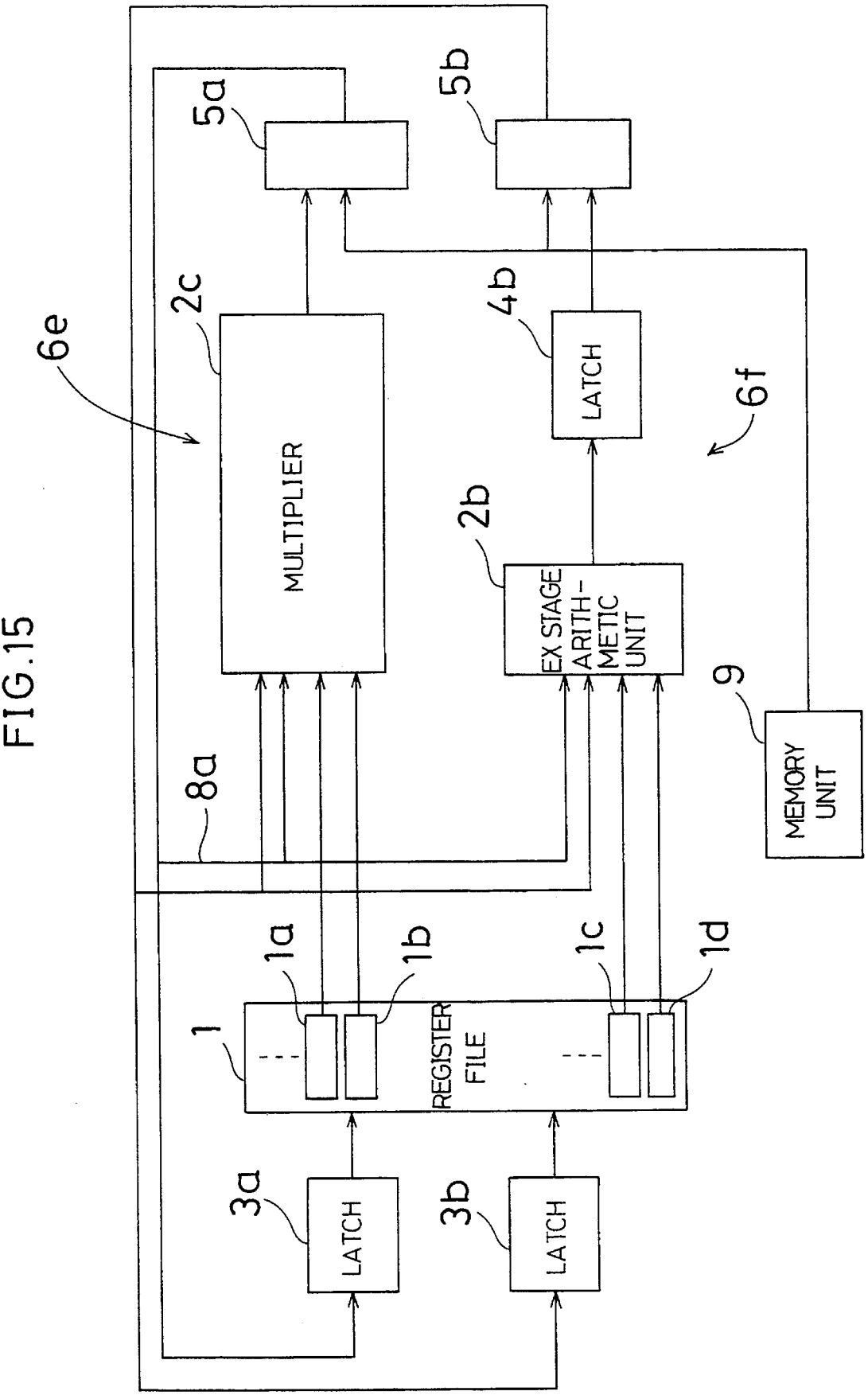
FIG. 15 is a block diagram showing a pipeline processor according to the fourth prior art.
Figure 16:
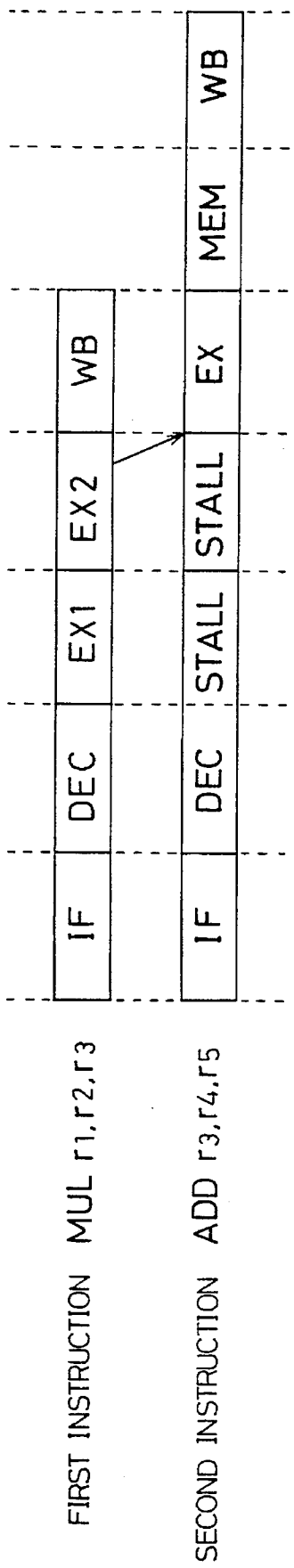
FIG. 16 is a diagram showing the operation of the pipeline processor according to the fourth prior art.

FIG. 8 is a diagram showing the operation of the pipeline processor according to the fourth embodiment of the present invention. In FIG. 8, the first instruction to be executed earlier is a multiplication instruction MUL. The multiplication instruction MUL stores, in a register r3, the product of data stored in a register r1 and data stored in a register r2. The second instruction to be executed next to the first instruction is an addition instruction ADD. The addition instruction ADD adds data stored in the register r3 and data stored in a register r4, and stores the operation result in a register r5. In the pipeline processor according to the fourth embodiment, the operation result of the first instruction, i.e., multiplication instruction MUL is stored in the register r3 and is also used for the operation of the second instruction, i.e., addition instruction ADD.

As described above, the pipeline processor according to the fourth embodiment executes the first and second instructions simultaneously. In an IF stage of the first instruction, the first arithmetic unit 40a reads out the first instruction. In a DEC stage of the first instruction, the first arithmetic unit 40a decodes that the first instruction is a multiplication instruction MUL and inputs data stored in the registers 1a and 1b of the register file 1 to the multiplier 2c, respectively. In EX1 and EX2 stages of the first instruction, the multiplier 2c of the first arithmetic unit 40a needs two cycles to multiply data read out from the registers 1a and 1b of the register file 1. In the EX2 stage of the first instruction, the result of multiplication is inputted to the first WB stage latch 3a and WB stage arithmetic unit 43. In a WB stage of the first instruction, the result of multiplication is stored in the register file 1 through the first WB stage latch 3a and third selective circuit 41a.

Similarly, the second arithmetic unit 40b reads out the second instruction in an IF stage of the second instruction, and decodes that the second instruction is an addition instruction ADD in a DEC stage thereof. The first and second instructions are also inputted to the data dependence detecting unit 44, respectively. The data dependence detecting unit 44 checks whether there is the data dependent relationship between the first and second instructions, that is, the operation result obtained by executing the first instruction, i.e., multiplication instruction MUL is used for the operation of the second instruction, i.e., addition instruction ADD. When the data dependence detecting unit 44 detects that there is the data dependent relationship between the first and second instructions, i.e., the multiplication instruction MUL and the addition instruction ADD, it outputs a detection signal to the control unit 45. In the case where there is the data dependent relationship between the first and second instructions, only the data stored in the register 1d of the register file 1 is read out by the EX stage arithmetic unit 2b in the DEC stage of the second instruction.

In an EX stage of the second instruction, addition is not executed. In a MEM stage of the second instruction, the data inputted to the EX stage arithmetic unit 2b is inputted to the WB stage arithmetic unit 43. As described above, the operation result of the first instruction, i.e., multiplication instruction MUL is inputted to the WB stage arithmetic unit 43 in the EX2 stage of the first instruction. In a WB stage of the second instruction, accordingly, the WB stage arithmetic unit 43 executes addition so that the operation result of the second instruction, i.e., addition instruction ADD is obtained. In the WB stage of the second instruction, the operation result of the second instruction, i.e., addition instruction ADD is stored in the register file 1.

In the pipeline processor according to the fourth embodiment, in the case where the first instruction is a multiplication instruction MUL and the second instruction is an addition instruction ADD, the operation result of the first instruction is also inputted to the WB stage arithmetic unit 43 of the second arithmetic unit 40b when the data dependence detecting unit 44 detects the data dependent relationship that the operation result of the first instruction is used for the operation of the second instruction. The WB stage arithmetic unit 43 executes the addition of the second instruction in the WB stage subsequent to the EX stage of the second instruction. Consequently, there is not needed a stage for waiting for the second instruction to be executed.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A pipeline processor for carrying out pipeline processing of instructions to be input, which undergo a plurality of stages including an execution stage, comprising:

an arithmetic unit having a first stage arithmetic means for executing an arithmetic operation in the execution stage and a second stage arithmetic means for executing an arithmetic operation of an instruction in a stage subsequent to the execution, the arithmetic unit being provided for pipelining a first instruction and a second instruction to be executed next to the first instruction;

data dependence detecting means for detecting a data dependence relationship between the first instruction and the second instruction; and control means for outputting a control signal when the data dependence detecting means detects the presence of the data dependence relationship between the first instruction and the second instruction, wherein when the control signal is output from the control means, in the arithmetic unit, the arithmetic operation of the second instruction is not executed in the execution stage but is executed by the second stage arithmetic means in the stage subsequent to the execution stage.

2. A pipeline processor according to claim 1 wherein a time for executing an arithmetic operation of the first instruction is equal to or longer than a time for executing an arithmetic operation of the second instruction.

3. A pipeline processor according to claim 2, wherein the first instruction is a load instruction.

4. A pipeline processor according to claim 3, wherein said stage arithmetic means is write stage arithmetic means for executing the operation of the second instruction in a write stage subsequent to an execution stage of the second instruction.

5. A pipeline processor according to claim 2, wherein said stage arithmetic means is memory stage arithmetic means for executing the operation of the second instruction in a memory stage subsequent to an execution stage of the second instruction.

6. A pipeline processor according to claim 2, wherein said stage arithmetic means is write stage arithmetic means for executing the operation of the second instruction in a write stage subsequent to an execution stage of the second instruction.

7. A pipeline processor according to claim 1, wherein said stage arithmetic means is memory stage arithmetic means for executing the operation of the second instruction in a memory stage subsequent to an execution stage of the second instruction.

8. A pipeline processor according to claim 1, wherein said stage arithmetic means is write stage arithmetic means for executing the operation of the second instruction in a write stage subsequent to an execution stage of the second instruction.

9. A pipeline processor for carrying out pipeline processing of instructions to be input, which undergo a plurality of stages including an execution stage, comprising:
- a first arithmetic unit, having a first stage arithmetic means for executing an arithmetic operation of an instruction in the execution stage, for executing a first instruction;
- a second arithmetic unit having a second stage arithmetic means for executing an arithmetic operation of an instruction in the execution stage and a third stage arithmetic means for executing an arithmetic operation of an instruction in a stage subsequent to the execution stage, the second arithmetic unit being provided for executing the second instruction to be executed next to the first instruction simultaneously with the execution of the first instruction;
- data dependence detecting means for detecting the presence of a data dependence relationship between the first instruction and the second instruction; and
- control means for outputting a control signal when the data dependence detecting means detects the presence of the data dependence relationship between the first Instruction and the second instruction;
- wherein when the control signal is output from the control means, in the second arithmetic unit, the arithmetic operation of the second instruction is not executed in the execution stage but is executed by the third stage arithmetic means In a stage subsequent to the execution stage.

10. A pipeline processor according to claim 9, wherein a time for executing an arithmetic operation of the first instruction is equal to or longer than a time for executing an arithmetic operation of the second instruction.

11. A pipeline processor according to claim 10, wherein the first instruction is a load instruction.

12. A pipeline processor according to claim 11, wherein said stage arithmetic means is write stage arithmetic means for executing the operation of the second instruction in a write stage subsequent to an execution stage of the second instruction.

13. A pipeline processor according to claim 10, wherein said stage arithmetic means is memory stage arithmetic means for executing the operation of the second instruction in a memory stage subsequent to an execution stage of the second instruction.

14. A pipeline processor according to claim 10, wherein said stage arithmetic means is write stage arithmetic means for executing the operation of the second instruction in a write stage subsequent to an execution stage of the second instruction.

15. A pipeline processor for simultaneously processing a load instruction and an arithmetic instruction to be executed next to the load instruction both of which undergo a plurality of stages including an execution stage, comprising:
- a memory device for storing data;
- a register file for holding data read out from the memory device according to a load instruction;
- a first arithmetic unit having a first stage arithmetic means for executing an arithmetic operation of an instruction in the execution stage, said first arithmetic unit for processing a load instruction;
- a second arithmetic unit for processing an arithmetic instruction, said second arithmetic unit having a second stage arithmetic means for executing an arithmetic operation of an instruction in the execution stage;
- a third stage arithmetic means for executing an arithmetic operation of an instruction in a stage subsequent to an execution stage;
- data dependence detecting means, which receives the load instruction and the arithmetic instruction, for detecting whether the arithmetic instruction uses the data read out from the memory device according to the load instruction; and
- control means for outputting a control signal when the data dependence detecting means detects that the arithmetic instruction uses the data read out from the memory device according to the load instruction,
- wherein when no control signal is output from the control means, the arithmetic operation of said arithmetic instruction is executed in the execution stage by the second stage arithmetic means, and
- wherein when a control signal is output from the control means, the data read out from the memory device according to the load instruction is input to the third stage arithmetic means so that the arithmetic operation of said arithmetic instruction is executed in the stage subsequent to the execution stage by the third stage arithmetic means.

* * * * *